United States Patent Office.

WILLIAM CAMERON SILLAR, OF MATHERAN, SYDENHAM HILL, ROBERT GEORGE SILLAR, OF 7 CINTRA PARK, UPPER NORWOOD, AND GEORGE WILLIAM WIGNER, OF GROVE LANE, CAMBERWELL, GREAT BRITAIN.

Letters Patent No. 91,373, dated June 15, 1869.

IMPROVED MODE OF PURIFYING AND DEODORIZING SEWAGE, &c.

The Schedule referred to in these Letters Patent and making part of the same.

Be it known that we, WILLIAM CAMERON SILLAR, of Matheran, Sydenham Hill, gentleman, ROBERT GEORGE SILLAR, of No. 7 Cintra Park, Upper Norwood, gentleman, and GEORGE WILLIAM WIGNER, of Grove Lane, Camberwell, analytical chemist, all in the county of Surrey, Great Britain, have invented a new Mode of Purifying and Deodorizing Sewage, and water impregnated with sewage, and making manure therefrom; and we hereby declare that the following is a full and exact description thereof.

The nature of the invention is as follows:

We add to the sewage to be purified a mixture, consisting of the following ingredients:

Alum, blood, clay, magnesia or one of its compounds, (by preference the carbonate or sulphate,) burnt clay, otherwise known as ballast, animal charcoal, vegetable charcoal, chloride of sodium, manganate of potash or other compound of manganese, sulphate of lime, and magnesian limestone.

Of these ingredients, the magnesia, burnt clay, chloride of sodium, magnesian limestone, and compound of manganese, may in some cases be omitted, and if any other of the ingredients should, from any cause, be present in sufficient quantity in the sewage, it may be omitted.

In many cases, it is preferable to add the compound of manganese after the sediment caused by the other substances has subsided.

The proportions in which the ingredients are to be used vary much, according to the nature of the sewage to be purified, as, for instance, if the sewage contains much urine, we increase the proportion of clay. If it is much diluted, we increase the proportions of alum and blood. If it contains much street-refuse, we decrease the proportion of clay; but the following proportions have been found to answer well with ordinary sewage:

Alum, six hundred parts.
Blood, two parts.
Animal charcoal, thirty parts.
Vegetable charcoal, forty parts.
Clay, nineteen hundred parts.
Burnt clay, fifty parts.
Magnesia, eleven parts.
Chloride of sodium, twenty-five parts.
Manganese, four parts.
Sulphate of lime, fifteen parts.
Magnesian limestone, four parts.

These substances are mixed together, and added to the sewage to be purified until a further addition produces no further precipitate. The quantity required will be about four pounds to one thousand gallons of sewage.

In most cases, it is preferable to mix the above compound with water, and add it, in a liquid state, to the sewage.

Should any of the above ingredients be present in sufficient quantity in the sewage, it may, of course, be omitted from the mixture.

The sewage must then be thoroughly mixed with the compound, and allowed to flow into settling-tanks.

The greater part of the organic and other impurities will be immediately separated, in the form of large flakes, which rapidly fall to the bottom, leaving the supernatant water clear, and inodorous, or nearly so.

The water may then be allowed to flow away into a river, or disposed of in any other way, and, if the compound of manganese has been omitted from the first mixture, it may be added before the water is allowed to enter the river. The sediment, or mud may be allowed to accumulate at the bottom of the tank.

This sediment will be found to possess the power of precipitating a further quantity of sewage. It must, therefore, be pumped or otherwise raised from the tank, and mixed with fresh sewage as it enters the tank, the sediment being allowed to subside in the same way as before. The sediment may be used five or six times over in this way.

When the sediment no longer possesses the power of precipitating the impurities in the water, it must be removed from the tank, and allowed to dry. When partially dry, a small quantity of acid, by preference sulphuric acid, may be mixed with it, which will retain all the ammonia in a soluble form.

When dried, the sediment will be a valuable manure.

What we claim as our invention, and desire to secure by Letters Patent, is—

1. The mixture of chemical substances above described, for the purpose of purifying sewage or water impregnated with sewage.

2. The right of using the mud precipitated from sewage, as above described, for the purpose of purifying a further quantity of sewage.

3. The addition of an acid to the mud, in order to retain the ammonia, and fit it for sale as a manure.

In witness whereof, we have hereunto subscribed our names, in the presence of two witnesses, this 15th day of December, 1868.

W. C. SILLAR.
      ROB. G. SILLAR.
      G. W. WIGNER.

Witnesses:
 THOMAS LAKE, } Both of No. 17 Gracechurch
 T. L. WARNER, } Street, London.